(No Model.)
F. M. ASHLEY.
APPARATUS FOR STERILIZING LIQUIDS.
No. 572,514. Patented Dec. 8, 1896.
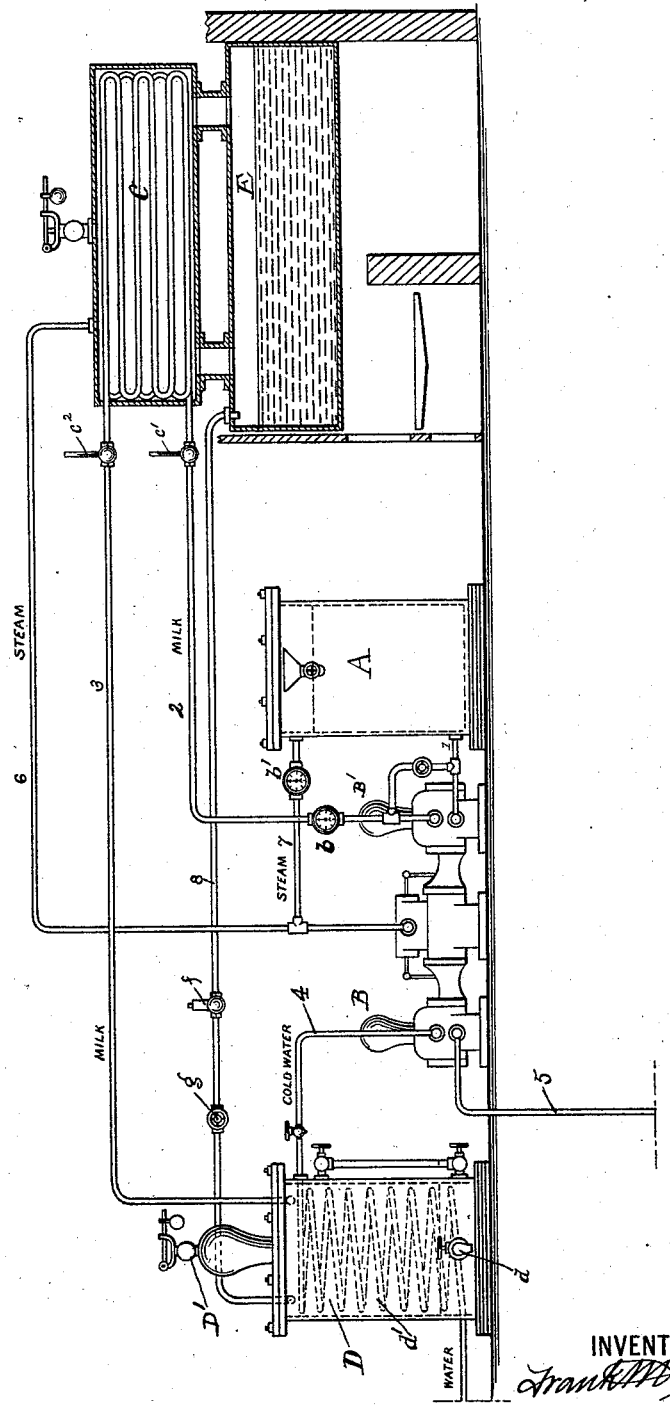
WITNESSES:
Frank S. Ober,
C. D. Pollock,
INVENTOR
Frank M. Ashley
BY
Lawyer & Edwards,
ATTORNEYS.

UNITED STATES PATENT OFFICE.

FRANK M. ASHLEY, OF HAWTHORNE, NEW JERSEY.

APPARATUS FOR STERILIZING LIQUIDS.

SPECIFICATION forming part of Letters Patent No. 572,514, dated December 8, 1896.

Application filed March 19, 1895. Serial No. 542,337. (No model.)

*To all whom it may concern:*

Be it known that I, FRANK M. ASHLEY, a citizen of the United States, and a resident of Hawthorne, in the county of Passaic and State of New Jersey, have invented certain new and useful Improvements in Liquid-Sterilizers, of which the following is a specification.

The present invention relates to an improvement in apparatus for the sterilization of water, milk, or other liquids, and has for its object the complete destruction of any germs of disease or bacteria which may exist in the liquid, and also the construction of an economical and effective apparatus for accomplishing this result.

I have designed the invention particularly for use in connection with the sterilization of milk.

Among other ways milk has heretofore been sterilized by heating it to a point below 212° Fahrenheit and then allowing it to cool again. This process is objectionable for various reasons, principally that unless milk is heated at least as high as the boiling-point the germs of disease are not all destroyed. Another objectionable feature in connection with apparatus heretofore used is that it is extremely difficult to regulate the temperature so that the milk will not boil. Boiling of the milk in the process of sterilization must be avoided for the reason that it destroys to a certain extent the nutritive quality of the milk, but as the most dangerous disease-producing microbes are not destroyed except at the higher temperature than the boiling-point it is necessary for a complete and effective sterilizing apparatus that it be so constructed as to heat the liquid to a point above the boiling-point and keep it in that heated condition for an appreciable length of time, but at the same time keep the liquid under such pressure that it will not boil.

It is a fact well known that when liquids are heated under pressure the boiling-point is raised as the pressure upon the liquid increases, and therefore by subjecting the liquid to sufficient pressure it may be heated to a temperature far above the boiling-point; but in order to make the operation practically successful it should be continuous and pressure evenly applied.

The present invention, therefore, broadly comprehends a circulation of the liquid through a heater where it is raised to a temperature above the boiling-point, a sufficient pressure being maintained upon the liquid at all times to prevent boiling of the same, said circulation being maintained by counter-pressures at the beginning and end of the system, the pressure at the end being lower than that at the beginning.

To speak more in detail, the invention includes an apparatus for the sterilization of milk and the like comprising a receptacle for the liquid to be sterilized, a source of steam supply, pipes leading from said source of steam supply into the receptacle, a heating-chamber through which the liquid passes, with connections between the chamber and the source of steam supply, a second receptacle for the liquid at the opposite end of the system from the first receptacle also connected with the source of steam supply, with means for carrying the liquid in the second receptacle while it is under steam-pressure, whereby steam is supplied simultaneously to the receptacles on opposite ends of the system and the pressures practically counterbalanced.

The invention further includes various features of construction and arrangements of parts hereinafter described, and referred to in the appended claims.

In the accompanying drawing the figure represents a sectional view of an apparatus constructed in accordance with my invention.

Referring to the drawing by letter, A represents a tank in which is stored the milk or other liquid to be sterilized. At its lower end a conduit-pipe 1 leads from thence through a pressure-indicator *b* into a conduit-pipe 2, which is connected with one end of the heater-coil C, the other end of the coil C being connected to a conduit-pipe 3, leading to a tank D, provided with an outlet-cock *d*, through which liquid may pass to any desired place of storage or distribution. Cock *d* may, however, be so arranged that the liquid stored in tank D must have attained a certain determined pressure before it can pass out. This result may be obtained by the use of any ordinary form of pressure-valve. Conduit-pipes 2 and 3 each contain retarding-valves $c'$ and $c^2$, respectively, for a purpose which will more fully hereinafter appear. In tank D is located a coil $d'$, through which cold water is circulated by pump B through pipe 4, the water being drawn through pipe 5 from any suitable source of supply. Coil C is located inside of a steam-chamber supplied with steam from a boiler E. A pipe 6 conveys steam from the boiler to pump B to operate the same. It also conveys steam through pressure-indicators $b'$ into the upper part of tank A.

6 is a pipe conveying steam from the boiler directly into the upper part of the tank D and provided with a reducing-valve $f$ and a cut-off valve $g$, whereby the pressure and quantity of steam in tank D may be regulated.

In the operation of the apparatus above described steam is generated in boiler E, conveyed through pipe 6 to pump B, setting it in motion and thereby causing the circulation of the cold water through pipe 4 and coil $d'$. Steam is also introduced directly from the boiler through pipes 6 and 7 into the upper part of tank A, where it comes in contact with the milk and forces the latter through conduits 1 and 2 into and through heater-coil C, thence through conduit-pipe 3 into tank D, and from tank D through cock $d$ into a suitable place for storage or distribution. The steam introduced in the boiler into tank D through pipe 8 creates a counter-pressure upon the liquid, but by means of reducing-valve $f$ this pressure is regulated, so that it is less than that in the boiler and tank A, whereby a continual circulation of the liquid from tank A to tank D will be insured and at the same time the liquid will be under sufficient pressure to prevent its boiling at any time. The liquid is cooled when in tank D. While the liquid is passing through coil C it is heated by the live steam from the boiler to a temperature equal to that of the hot steam, considerably above 212°, thereby destroying all germs in the liquid and completely sterilizing it. Being under pressure at the time, it cannot boil, and by reason of the moistness of the steam it cannot become scalded at any stage of the operation.

I have also illustrated in the drawing a pump B', which, for certain reasons, is supplied with each apparatus, and this pump may be used to force the milk from the receptacle A through the heating-coils, and in this instance retarding-valves $c'$ $c^2$ are used in the milk-pipes to retard the flow of the liquid. So, also, a pump might be used at the opposite end of the system to make the counterbalancing-pressure. I do not consider these arrangements the equivalent, however, of the preferred form of apparatus described, in which the pressure of steam upon the body of liquid drives it through the system and the pressure of steam upon the opposite end of the system gives the counterbalancing-pressure; but these features are simply auxiliary and to a certain extent alternative.

Having thus described my invention, what I claim, and desire to secure by Letters Patent, is—

1. In an apparatus for the sterilization of milk and the like, a receptacle for the milk or other liquid to be sterilized, a source of steam supply, pipes leading from said source of steam supply into said receptacle, a heating-chamber through which the liquid passes and connections between said chamber and the source of steam supply, a second receptacle for the milk or other liquid located at the opposite end of the system from the first receptacle, a conduit extending between the same and the source of steam supply, a conduit for the milk or other liquid extending between the heating-chamber and said second receptacle and means for cooling the liquid in said second receptacle while it is under steam-pressure, whereby steam is supplied simultaneously to the receptacles on opposite ends of the system and the pressures practically counterbalanced; substantially as described.

2. In an apparatus for the sterilization of milk and the like, a receptacle for the milk or other liquid to be sterilized, a source of steam supply, pipes leading from said source of steam supply into said receptacle, a heating-chamber through which the liquid passes and connections between said chamber and the source of steam supply, a second receptacle for the milk or other liquid located at the opposite end of the system from the first receptacle, a conduit extending between the same and the source of steam supply, a conduit for the milk or other liquid extending between the heating-chamber and said second receptacle and means for cooling the liquid in said second receptacle while it is under steam-pressure, whereby steam is supplied simultaneously to the receptacles on opposite ends of the system and the pressures practically counterbalanced, said steam-pipe between the source of steam supply and the cooling-receptacle being provided with a reducing-valve; substantially as described.

3. In the herein-described system for sterilizing and subsequently cooling milk or other liquid, receptacles located at either end of the system, conduit-pipes leading from the one to the other and an intermediate heating-chamber through which the liquid passes, a source of steam supply and connections between said source of steam supply and the heating-chamber and also the liquid-receptacles and means for cooling the liquid in one of said receptacles; substantially as described.

Signed at New York, in the county of New York and State of New York, this 16th day of March, A. D. 1895.

FRANK M. ASHLEY.

Witnesses:
C. V. EDWARDS,
ABM. KOPEL.